United States Patent [19]

Wilgren

[11] Patent Number: 4,798,173
[45] Date of Patent: Jan. 17, 1989

[54] FREEZABLE PET DISH

[76] Inventor: Thomas J. Wilgren, 9 Battery St., Apt. No. 2, Boston, Mass. 02113

[21] Appl. No.: 68,458

[22] Filed: Jul. 1, 1987

[51] Int. Cl.⁴ .............................................. A01K 7/00
[52] U.S. Cl. ......................................... 119/61; 62/457
[58] Field of Search ............... 119/61, 62, 63; 62/371, 62/372, 457

[56] References Cited

U.S. PATENT DOCUMENTS

| 648,953 | 5/1900 | Hanson | 119/62 |
|---|---|---|---|
| 2,767,563 | 12/1956 | Picascia | 220/23.83 |
| 3,121,419 | 2/1964 | Gillespie | 119/61 |
| 3,130,163 | 4/1964 | Avera | 252/67 |
| 3,302,428 | 2/1967 | Stoner et al. | 62/529 |
| 3,715,895 | 2/1973 | Devlin | 62/457 |
| 3,749,063 | 7/1973 | Buffum | 119/61 |
| 3,757,852 | 9/1973 | Allinger | 62/371 |
| 3,858,410 | 1/1975 | Drake | 62/437 |
| 4,007,711 | 2/1977 | Michael | 119/62 |
| 4,306,424 | 12/1981 | Chavoor | 62/529 |
| 4,324,111 | 4/1982 | Edwards | 62/457 |
| 4,357,809 | 11/1982 | Held et al. | 62/457 |
| 4,505,228 | 3/1985 | Scott | 119/62 |
| 4,576,118 | 3/1986 | Meadows | 119/62 |
| 4,691,664 | 9/1987 | Crowell | 119/61 |

Primary Examiner—Robert Peshock
Attorney, Agent, or Firm—Wolf, Greenfield & Sacks

[57] ABSTRACT

A pet dish designed to contain food for an extended period of time by use of an integral coolant which aids in preventing spoilage. A removable, transparent cover allows a pet to see the food and provides a means for accessing the food. The cover is designed to allow it to be opened by the pet.

4 Claims, 1 Drawing Sheet

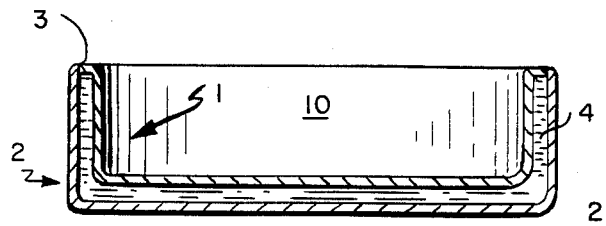
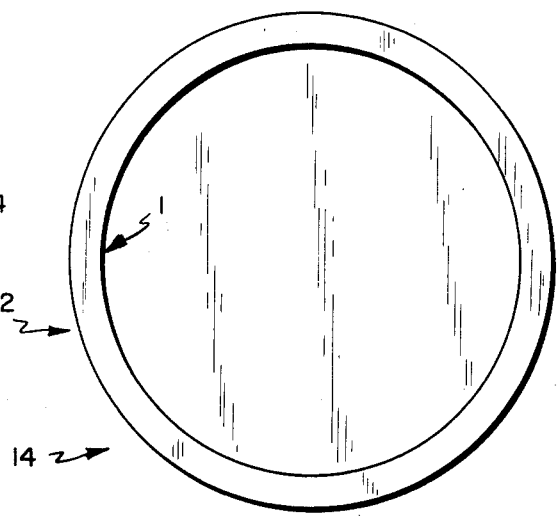
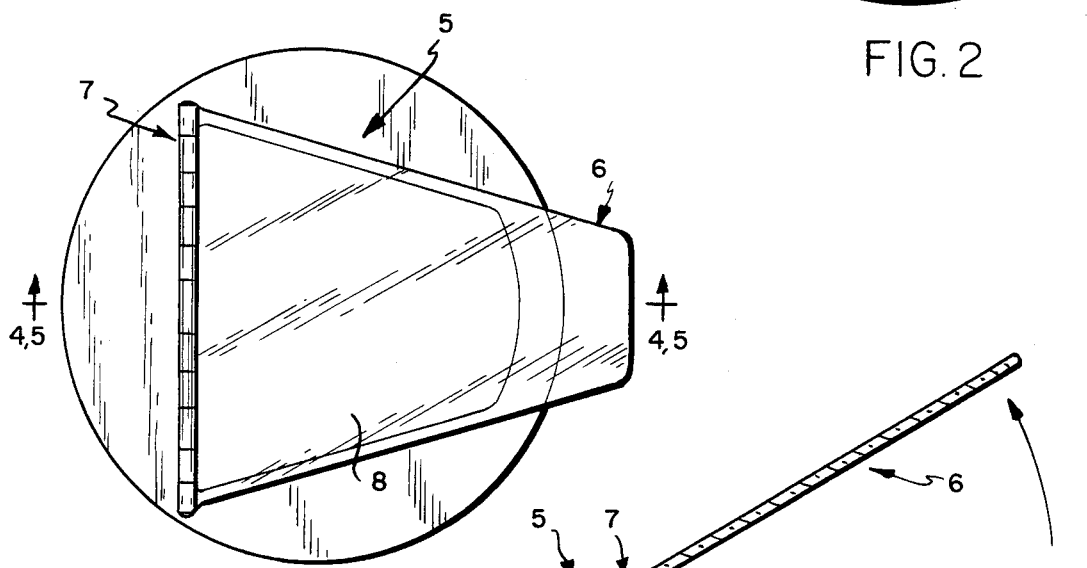
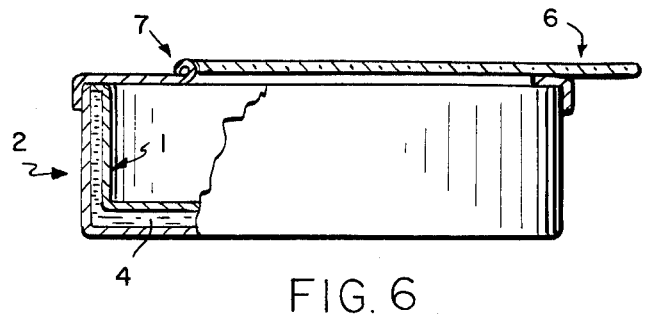

FREEZABLE PET DISH

BACKGROUND OF THE INVENTION

The invention relates to an animal or pet dish which would provide an environment in which food, generally perishable after a short time, would be contained relatively free of insects and preserved for an extended period of time.

One such device is disclosed in U.S. Pat. No. 4,505,228 where an insect isolating tray provides protection and a hinged cover provides access to the food or water. Other pet dishes are shown in U.S. Pat. Nos. 4,306,424 to Chavoor, 4,576,118 to Meadows, 3,121,419 to Gillespie, 4,007,711 to Michael and 3,749,063 to Buffum. U.S. Pat. Nos. 2,767,563 to Picascia, 3,757,852 to Allinger, 3,858,410 to Drake and 3,302,428 to Stoner show various apparatus for heating or cooling containers.

SUMMARY OF THE INVENTION

The present invention is a pet dish designed to contain food for an extended period of time by use of an integral coolant. The invention allows pet food to be left out and available to a pet for an extended period of time while cooling the food to prevent spoilage. In addition, there is a removable cover which provides a means for accessing the food. The cover is designed to allow it to be opened by the pet and preferably includes a transparent portion to allow a pet to see the food. Other features and advantages of the invention will become apparent to those skilled in the art during the following description.

BRIEF DESCRIPTION OF THE DRAWINGS

FIG. 1 is a central vertical section of the freezable pet dish.

FIG. 2 is a top plan view of the dish.

FIG. 3 is a top plan view of the means for covering the dish.

FIG. 4 is a central vertical section of the means for covering the dish with the lid up.

FIG. 5 is a central vertical section of the means for covering the dish with the lid down.

FIG. 6 is a central vertical section of the combination of the dish and the means for covering the dish.

DESCRIPTION OF THE PREFERRED EMBODIMENT

Referring now to the drawings, the freezable pet dish comprises a dish or bowl 14, as shown in FIGS. 1 and 2, and a cover 5, as shown in FIGS. 3, 4, and 5, which are joined as shown in FIG. 6.

The dish in its basic form comprises an inner shell portion 1 and an outer shell 2. Inner shell portion 1 has a concave depression formed therein for holding the pet food. The shells 1 and 2 are joined at the edges 3 to create a space between the shells. In the space defined by the inner shell 1 and the outer shell 2, is a freezable coolant 4. This freezable coolant 4 is a stable liquid or solid material with a relatively large heat capacity. This freezable coolant might be, for example, a mixture of approximately 90% water, methyl paraben, cellulose gum and ortho aluminum acetate. Other suitable materials for the coolant will be apparent to those of ordinary skill in the art.

The dish is prepared for use by placing it in a cold environment, such as a freezer or refrigerator, for a period of time long enough to lower the temperature of the coolant to the desired level. For use, the dish is removed from the cold environment and filled with food. The contents of the dish remain at a constant temperature for an extended period, thus incurring less spoilage then has bee experienced with previously known dishes, bowls or feeders.

The dish may be made of a plastic material, such as polyethylene and may be injected molded or blow molded and filled with the freezable coolant. The elements or compounds used to construct this dish should be durable and non-toxic.

If a material with relatively high thermal conductivity is used in this blow-molding process, the exterior of the dish may optionally be coated or covered with a material which is poor heat conductor, to prevent rapid heat gain from the surrounding environment.

Thus, by providing an inner shell with good thermal conductivity characteristics, heat is readily drawn from the inner content of the dish into the freezable coolant 4 and at the same time heat is not rapidly gained from the surrounding environment.

The cover 5 is adapted to be attached to the dish. Cover 5 includes an opening 8, and a lid 6 which extends over the edge of the cover 5 and is thus easily engaged by the pet to lift the lid as shown in FIG. 4. The lid 6 will be held in place by a hinge 7 or other type of connecting device that will allow the lid 6 to be easily opened, thus affording the pet self initiated access to the bowl. Optionally a spring on the hinge can be used to provide downward pressure to ensure closure of the lid when the pet is finished. At least a portion of the cover 5 and lid 6 will be transparent to allow the pet to see the contents of the bowl. In the described embodiment, this is done by making lid portion 6 from clear plastic.

The bowl and cover will be designed so that they can be joined into a single unit as shown in FIG. 6. The self contained unit can then be filled with food and placed in the pet feeding location.

The form of the invention shown and described here is to be taken as preferred embodiment and various changes in the shape size and arrangement of parts may be made to without departing from the scope of the invention. Accordingly the invention should not be limited to the described embodiments but should be interpreted only in accordance with the following claims.

What is claimed is:

1. A freezable pet dish for a pet food, comprising: a double walled container having an inner shell which has formed in the top surface thereof a concave depression adapted to contain a pet food, and an outer shell connected to the inner shell along the periphery of said concave depression to form an enclosed coolant space between the outer shell and the inner shell which substantially surrounds the concave depression on the bottom and sides thereof;

the outer shell being provided with a coating which has a lower heat conductivity than the outer shell thereby to prevent rapid heat gain from the surrounding environment;

coolant means contained within said coolant space for storing heat or cold; and a cover for the concave depression including:

rim means adapted to mate with the double walled container for removably securing the cover to the double-walled container; and a lid in the cover for providing access to a pet food in the depression and having a portion thereof adapted to be lifted by a pet;

at least a part of the lid being constructed from a transparent material so as to provide for disclosure of the dish's contents to a pet; and the lid being connected to the rim means by a hinge and having an edge which protrudes beyond the periphery of the bowl so that the pet can lift the lid and gain entry to the bowl.

2. A freezable pet dish as recited in claim 1 wherein the coolant is approximately 90% water.

3. A freezable pet dish as recited in claim 1, wherein there is an inner shell or surface that has good thermal conductivity so that heat is readily drawn from the inner contents of the bowl into the freezable coolant.

4. A freezable pet dish as recited in claim 1 further including a spring device attached to the hinge to ensure closing of the lid following use by the pet.

* * * * *

UNITED STATES PATENT AND TRADEMARK OFFICE
CERTIFICATE OF CORRECTION

PATENT NO. : 4,798,173
DATED : January 17, 1989
INVENTOR(S) : Thomas J. Wilgren

It is certified that error appears in the above-identified patent and that said Letters Patent is hereby corrected as shown below:

Claim 1, Col. 2, line 60 should read --has a lower heat conductivity than the inner shell--.

Signed and Sealed this

Eighth Day of August, 1989

Attest:

DONALD J. QUIGG

Attesting Officer

Commissioner of Patents and Trademarks